United States Patent [19]
Foos et al.

[11] Patent Number: 5,634,559
[45] Date of Patent: Jun. 3, 1997

[54] PACKAGE TRAY HAVING REVERSIBLE NESTING AND ENCLOSING FASTENING FEATURE

[75] Inventors: Douglas E. Foos, Barrington; Todd O. Buck, Elburn; Richard L. Partlow, Jr., Naperville, all of Ill.

[73] Assignee: Plastofilm Industries, Inc., Wheaton, Ill.

[21] Appl. No.: 508,039

[22] Filed: Jul. 27, 1995

[51] Int. Cl.$^6$ .............. B65D 1/34; B65D 6/04; B65D 21/032; B65D 85/57
[52] U.S. Cl. .......... 206/518; 206/308.1; 206/507; 206/509; 206/564; 206/565; 220/4.26
[58] Field of Search ................... 206/518, 445, 206/444, 505, 504, 507, 509, 562, 564, 565, 308.1, 467, 471, 310, 303; 24/379.1; 220/306, 4.26

[56] References Cited

U.S. PATENT DOCUMENTS

| Re. 28,059 | 7/1974 | Mounts et al. ............ 206/518 X |
| D. 196,684 | 10/1963 | Weiss .................. 206/564 X |
| 2,986,790 | 6/1961 | Silver et al. ............ 24/379.1 X |
| 3,252,568 | 5/1966 | Steidinger . | |
| 3,272,329 | 9/1966 | Mehalor ............... 206/505 X |
| 3,876,130 | 4/1975 | Haase ................. 220/4.23 X |
| 3,902,540 | 9/1975 | Commisso . | |
| 3,933,295 | 1/1976 | Congleton . | |
| 3,956,510 | 5/1976 | Beall ................. 206/303 X |
| 4,327,831 | 5/1982 | Inaba et al. ............ 206/310 |
| 4,544,062 | 10/1985 | Maehara ............... 206/509 X |
| 4,739,883 | 4/1988 | Mohs et al. ............ 206/467 X |
| 4,872,551 | 10/1989 | Theros ................ 206/471 X |
| 5,036,980 | 8/1991 | Vigue et al. ........... 206/515 |
| 5,042,674 | 8/1991 | Ramsay et al. .......... 206/505 X |
| 5,356,023 | 10/1994 | Krupa ................. 220/4.24 |
| 5,400,904 | 3/1995 | Matson, III et al. ...... 206/509 X |

FOREIGN PATENT DOCUMENTS 8806559  9/1988  WIPO .................. 206/308.1

*Primary Examiner*—Allan N. Shoap
*Assistant Examiner*—Niki M. Kopsidas
*Attorney, Agent, or Firm*—Greer, Burns & Crain, Ltd.

[57] ABSTRACT

A package tray configured for use with at least one other such tray in forming reclosable enclosed packages includes a recess portion having an upper edge, a flange portion projecting from the upper edge and having upper and lower sides, at least one snap fastener of a first type located on the flange portion, and at least one snap fastener of a second type located on the flange portion in spaced relationship to the at least one fastener of the first type. Each of the first and second type fasteners is configured to be fastenable on both said upper and lower sides of said flange portion to opposing fasteners of like package trays. The first and second type fasteners are disposed on the flange portion so that when multiples of the package trays are placed in vertically stacked relationship, at least one opposing pair of the fasteners on adjacent trays engage each other to secure the trays together in one of a nested and an opposing relationship.

18 Claims, 3 Drawing Sheets

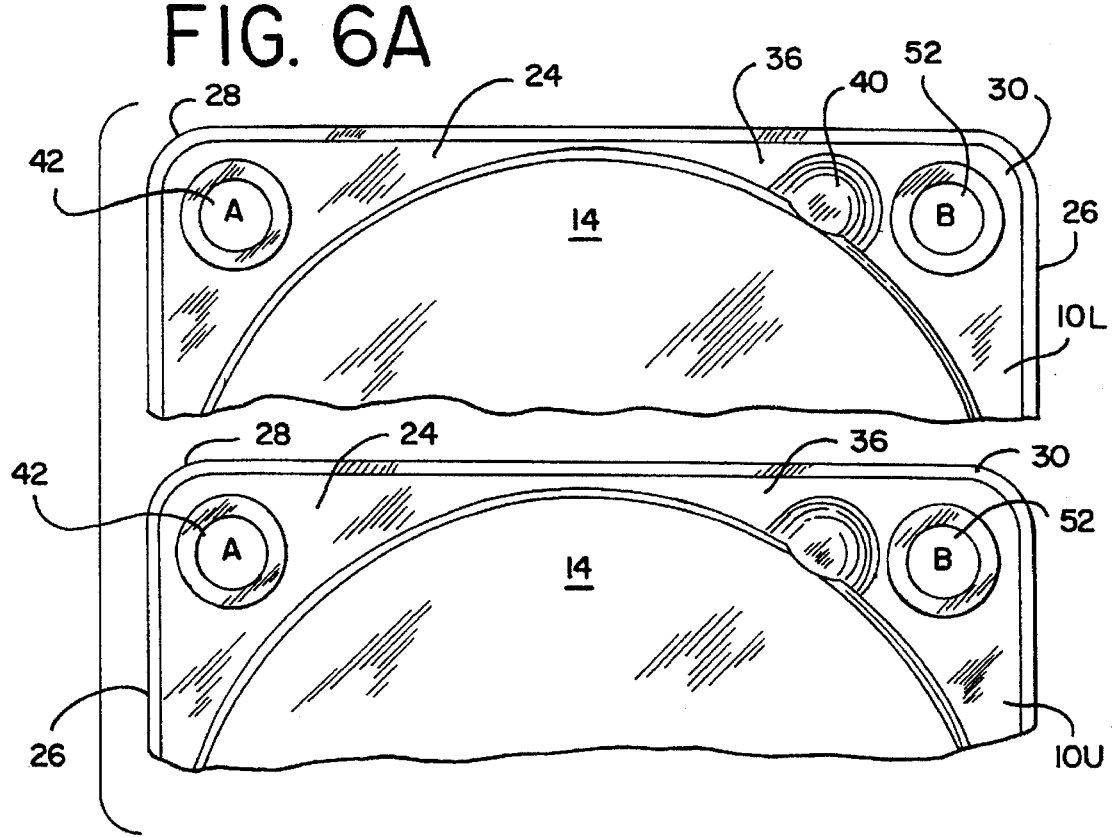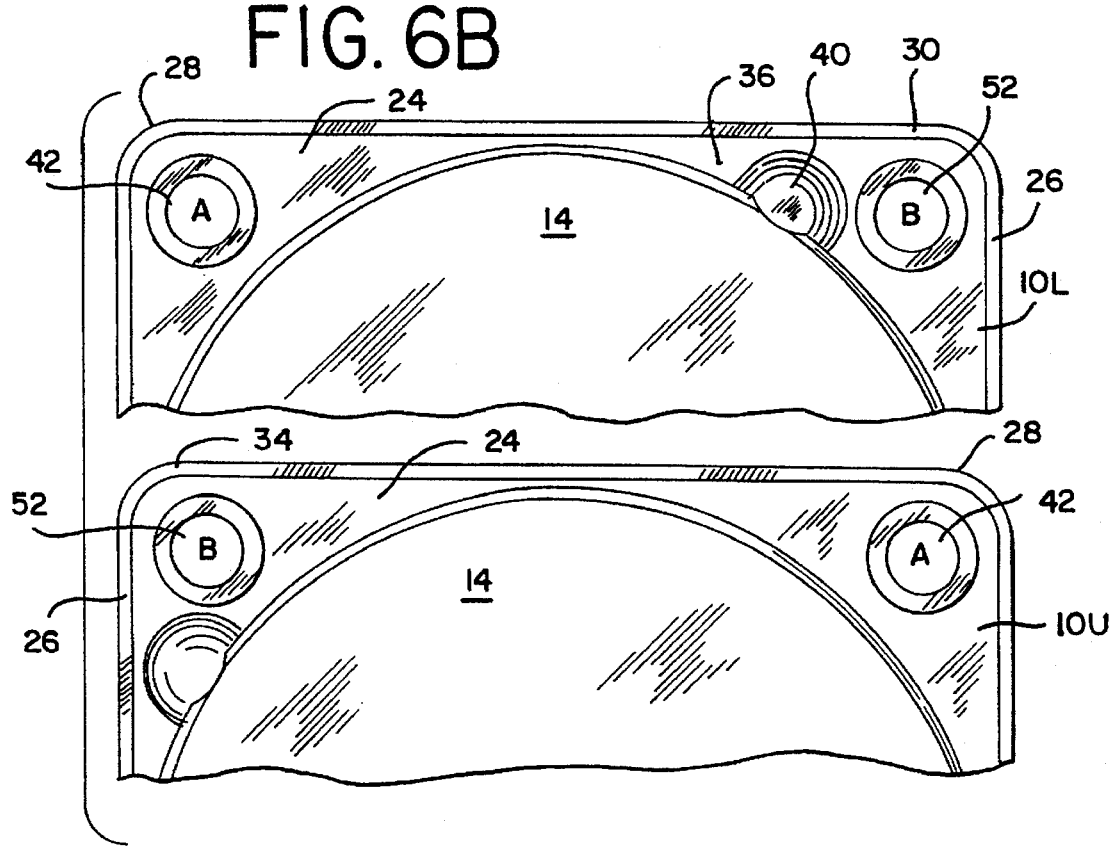

5,634,559

PACKAGE TRAY HAVING REVERSIBLE NESTING AND ENCLOSING FASTENING FEATURE

BACKGROUND OF THE INVENTION

The present invention relates generally to package trays used for shipping and/or storing products, and specifically to such a package tray having specialized fastener formations to enable fastening of stacked trays together in either a nesting or an opposed relationship.

Inexpensive package trays are known for, among other things, conveying either purchased or leftover food. Such packages typically include a pair of identical trays used to form the top and bottom of a reclosable package or container in opposed or face-to-face relationship. Such trays are typically molded of polystyrene foam or thermoformed of generally transparent polyvinylchloride, polyethylene or other suitable materials. These conventional package trays typically have some sort of integral fastening device to releasably secure the top and bottom tray relative to each other.

However, a major disadvantage of such trays is that prior to assembly, the individual trays are stored in vertically stacked, nested relationship. While some such trays are provided with integral fastening formations for securing the trays together in face-to-face or opposing relationship to form a closed container, there are no integral fasteners used to secure the stacked trays in relation to each other prior to assembly. This deficiency leads to the instability of relatively high stacks of such trays, and allows unwanted movement of stacked trays during shipping and handling. A further disadvantage of such trays is that they are unable to be formed into stacks in which multiple enclosed packages are fastened together.

It is common to package fragile, electronic information media such as compact discs in fairly elaborate, plastic packaging. Such packaging typically takes the form of multi-piece injection molded container which requires assembly. A hinged lid, a base and a separate liner piece are usually included. Aside from the cost of production and assembly, such compact disc packages are difficult to open by the consumer. It is not unusual for the consumer to exert such force in opening the package that the compact disc pops out of the package. Also, during shipment of bulk quantities of compact disc packages, the inability to secure stacks of packages impairs efficient shipping techniques.

Thus, there is a need for an inexpensive tray-type package which is made of a pair of identical tray members, and which has the capability for being secured in pre-assembly nested relationship. There is also a need for such a package which is suitable for packaging compact discs.

Accordingly, a first object of the present invention is to provide an improved package tray which has specialized fastener formations to enable fastening of stacked trays together in either an opposed or a nested relationship.

Another object of the present invention is to provide an improved package tray which has specialized fastener formations constructed and arranged so that the trays may form an enclosed package, to which additional trays may be fastened in piggy-back or nested relationship on either or both trays.

Yet another object of the present invention is to provide an inexpensive reclosable package for compact discs.

SUMMARY OF THE INVENTION

The above-identified objects are met or exceeded by the present package tray having a reversible nesting and reclosing fastening feature, in which multiples of a single package tray can be used to form a reclosable package of the sort suitable for compact discs, among other products. Each tray has a flange portion with alternating, spaced fastener formations. The fastener formations are provided in two distinct configurations, each having a structure which is engageable with a corresponding structure of an opposing fastener on an adjacent tray. Thus, through the use of the present fasteners, the trays can be secured in either an opposing or a nesting relationship. Furthermore, the fasteners are configured and arranged on the flanges of the tray so that additional trays may be secured in piggy back fashion on either or both trays of an opposed pair.

More specifically, the present invention provides a package tray configured for use with at least one other such tray in forming reclosable enclosed packages and includes a recess portion having an upper edge, a flange portion projecting from the upper edge and having upper and lower sides, at least one snap fastener of a first type located on the flange portion, and at least one snap fastener of a second type located on the flange portion in spaced relationship to the at least one fastener of the first type.

Each of the first and second type fasteners is configured to be fastenable on both said upper and lower sides of said flange portion to opposing fasteners of like package trays. The first and second type fasteners are disposed on the flange portion so that when multiples of the package trays are placed in vertically stacked relationship, at least one opposing pair of the fasteners on adjacent trays engage each other to secure the trays together in one of a nested and an opposed relationship. In some cases, one tray may have to be rotated relative to another tray to align the proper opposing engageable fasteners with each other.

BRIEF DESCRIPTION OF THE DRAWINGS

FIG. 6A is a fragmentary top plan view of a pair of the present trays as formed and in a nonengaged nesting relationship; and FIG. 6B is a fragmentary top plan view of a pair of the present trays as shown in FIG. 6A wherein the lowermost tray has been axially rotated 90° so that the first and second fastener types may be placed in engaged relationship.

DESCRIPTION OF THE PREFERRED EMBODIMENT

Figure 1:
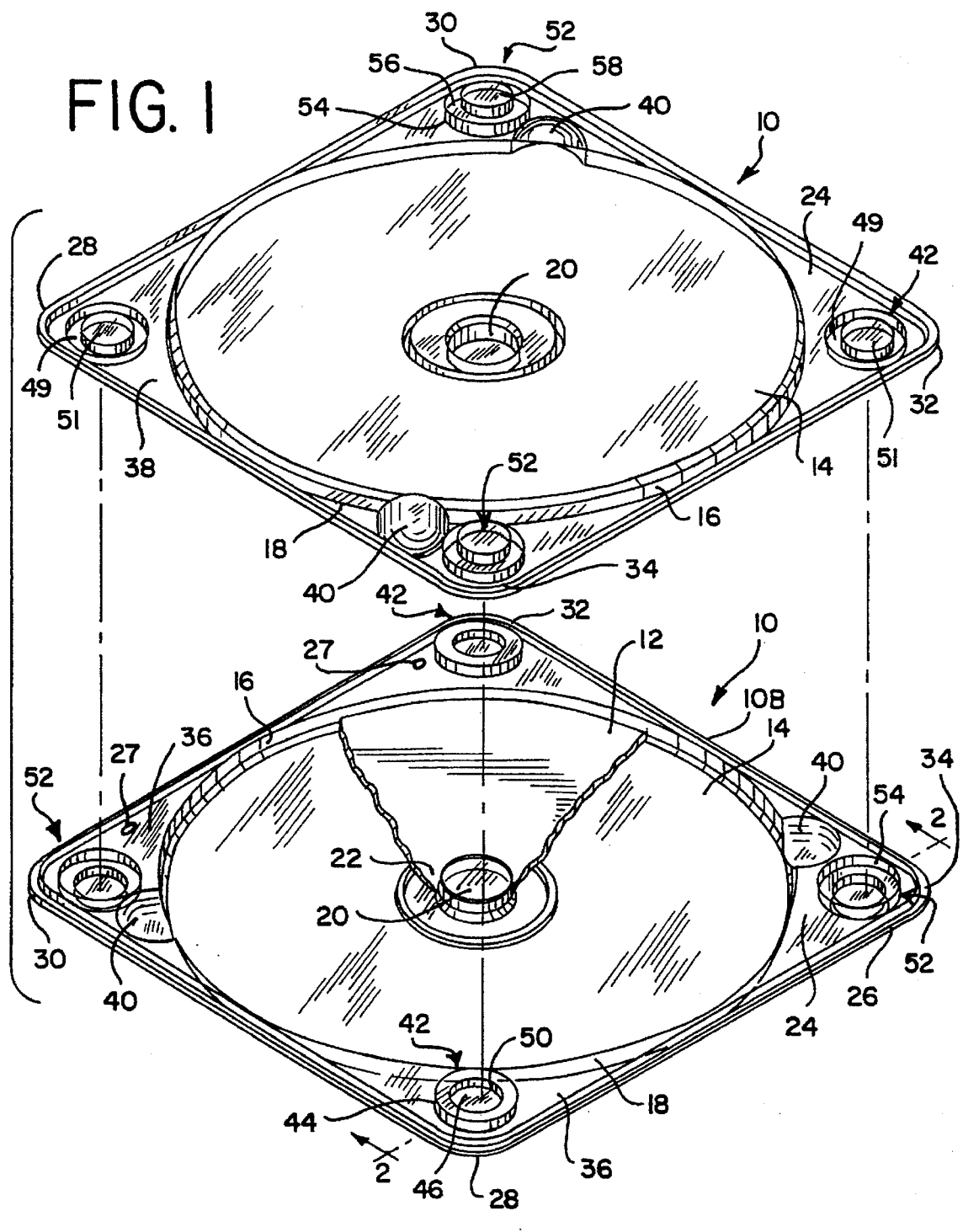
FIG. 1 is an exploded perspective view of a pair of the present trays shown in an opposed relationship.

Referring now to FIG. 1, a pair of the present trays, each generally designated 10, is shown in exploded opposed or face-to-face relationship so that when fastened to each other, an enclosed package is formed for an item such as a compact disc 12 (shown fragmentarily). Each tray 10 includes a recess portion 14 which is preferably planar and is defined by a peripheral wall 16 with an upper edge 18. In the preferred embodiment, the peripheral wall 16 projects at an approximate 90° angle to the recess portion, however other orientations are contemplated depending on the application.

A locator boss 20 is preferably centrally located on the recess portion 14, is configured to project vertically from the recess portion, and is dimensioned to accommodate the central aperture 22 of the compact disc 12 in a snap-fit relationship. Also, the recess portion 14 in the preferred embodiment has a diameter which is approximately 4⅝ inches (12 cm) to accommodate a standard compact disc, and for the same reason the wall 16 is high enough to retain the disc 12.

Projecting generally radially from the upper edge 18 of the peripheral wall 16 is a generally planar flange portion 24 having a generally square outer edge 26 defining four corners 28, 30, 32, 34. If desired, a series of mounting holes 27 may be placed along at least one of side of the edge 26 to permit the tray 10 to be mounted in a ringed binder (not shown). Although a square shape is preferred, other configurations for the flange portion 24 are contemplated, depending on the application. The flange portion 24 also has an upper surface 36 and a lower surface 38, these surfaces being designated with reference to the bottom tray 10B shown in FIG. 1. In the preferred embodiment, the flange portion 24 is provided with at least one and preferably two finger recesses 40, which are oriented to be in communication with the recess portion 14 to facilitate the extraction of the compact disc 12.

Figure 2:
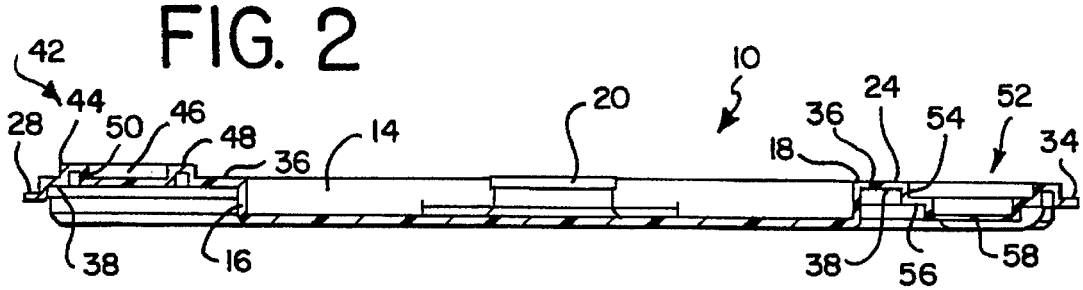
FIG. 2 is a sectional view taken along the line 2—2 of FIG. 1 and in the direction indicated generally.

Referring now to FIGS. 1 and 2, at least one and preferably two snap fasteners of a first type, generally designated 42, are located on the flange portion 24 at diametrically opposite corners 28 and 32. Each fastener 42 has an outer fastener formation 44 which, in the preferred embodiment, is an annular boss projecting vertically from the upper surface 36 of the flange portion 24. A recessed center portion 46 is defined by the annular boss 44, which also has a generally planar top 48.

In other words, viewed from the upper surface 36, the fastener 42 is basically a "male" ring defining a central "female" recess. The recessed center portion 46 is generally coplanar with the flange portion 24 and is surrounded by a wall 50 which projects vertically along a parallel axis to the central axis of the recess portion 14.

Viewed from the lower surface 38 of the flange portion 24, the fastener 42 forms an annular recess 49 which is the reverse side of the annular boss 44, and a smaller diameter boss 51 which is the reverse side of the recessed center portion 46. Thus, from the lower surface 38, the fastener 42 has an outer "female" ring surrounding a smaller diameter "male" boss. In the preferred embodiment, each first fastener type 42 is integrally formed with the tray 10.

The tray 10 also includes at least one and preferably two snap fasteners of a second type, generally designated 52 and located on the flange portion 24 in spaced, alternating relationship to the fasteners 42 of the first type, so the fasteners 52 are preferably located on the diametrically opposite corners 30 and 34. Each fastener 52 includes an outer fastener 54, which is preferably an annular outer boss having a bottom or floor 56 and which depends from the lower surface 38 of the flange portion 24. The depending outer boss 54 defines an annular inner boss 58 of smaller diameter than the outer boss, and which in turn depends from the floor 56 of the outer boss. Thus, when viewed from the upper surface 36 of the flange portion 24, the fastener 52 defines a two-stepped "female" recess, the first or larger diameter step is the reverse side of the annular outer boss 54, and the second or smaller diameter boss is the reverse side of the annular inner boss 58. In contrast, when viewed from the lower surface 38, the fastener 52 defines a larger diameter male boss having a smaller diameter male boss upon it. As is the case with the fastener 42, it is preferred that the entire fastener 52 be integrally formed with the tray 10.

It will be seen from FIG. 1 that the fasteners 42, 52 are disposed in alternating relationship around the periphery of the flange portion 24. It will also be seen from both FIGS. 1 and 2 that a portion of the fastener 52 is accessible from either the upper or lower surfaces 36, 38 of the flange portion 24. Thus, the fastener 52 has a fastening capability on either surface 36, 38 of the flange portion 24. This feature of the snap fasteners 52 is important in providing the ability of the present tray 10 to be fastenable to like trays in either opposed or nested relationship.

A significant aspect of the construction of the fasteners 42, 52 is that the various bosses and recesses of the first fastener 42 are matingly engageable in a snap fit relationship with the corresponding structures of an opposed fastener 52. More specifically, this means that the outer annular boss 44 of the fastener 42 is matingly engageable in the recess defined by the depending outer boss 54 in the fastener 52. Similarly, the recessed center portion 46 of the fastener 42 matingly accommodates the inner boss 58 of the fastener 52.

Figure 3:
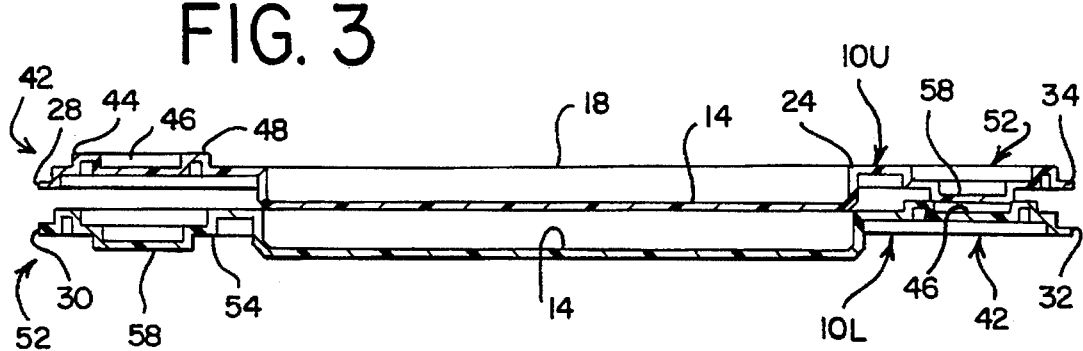
FIG. 3 is a sectional view as shown in FIG. 2 of a pair of the present trays about to be placed in a nesting relationship.
Figure 4:
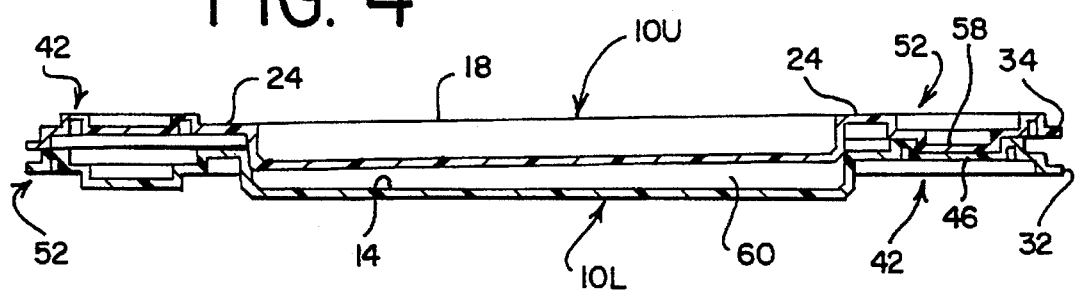
FIG. 4 is a sequential sectional view as shown in FIG. 3 of a pair of the present trays having been engaged in a nesting relationship.

Referring now to FIGS. 3 and 4, a pair of trays 10 are shown in fastened nesting relationship. By fastening trays in this position, stacks of unassembled trays may be more positively secured during shipping. In addition, this fastening relationship allows additional trays to be secured to an opposed fastened pair of trays as will be discussed below in relation to FIG. 5.

Referring now to FIG. 3, it will be seen that there are two trays, an upper tray 10U and a lower tray 10L. Both trays are identical to each other, however one has been rotated relative to the other about a common central axis to achieve the relationship shown. On the left side of the view shown, the two trays will not be fastenable, since there are no corresponding opposing features of fastener 42 and 52 which can matingly engage. However, referring now to the right side of the view shown, there will be mating engagement of the depending inner boss 58 of the fastener 52 of the tray 10U with the recessed central portion 46 of the tray 10L.

This view illustrates the aspect of the invention that in the nesting fastening relationship between trays, there will be fastening engagement at only two of the four corners 28, 30, 32, 34 of the flange portion 24. FIGS. 2–5 depict only two of the four corners of the entire trays, thus only one engagement between fasteners 42, 52 is seen.

While in FIG. 3 the upper tray 10U is being positioned for fastening, it more clearly shows the mating structure of the fasteners 42 and 52 prior to their being snapped together for fastening, as seen in FIG. 4. The snap fastening is accomplished by mere pressing of the two opposing corners 32,34 between the user's thumb and finger. Once fastened, a tight yet releasable friction fit is created between the recessed center portion 46 and the inner boss 58. Depending on the application, an enclosed chamber 60 is defined between the two trays 10U and 10L, which may be used to store a packaged article, such as a compact disc 12.

Figure 5:
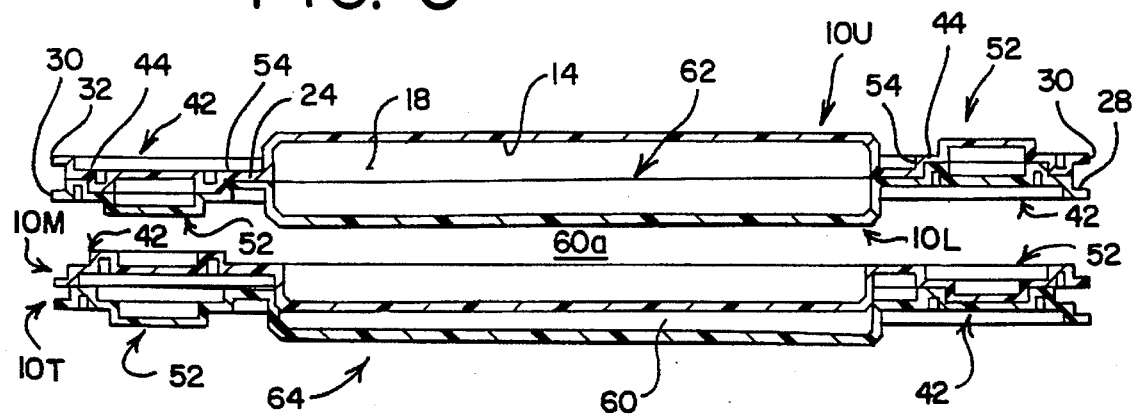
FIG. 5 is a sectional view as shown in FIG. 2 of a pair of the present trays shown in a fastened opposed relationship, with a pair of additional nested trays shown exploded away in section.

Referring now to FIG. 5, the trays 10U and 10L are shown in opposed or face-to-face relationship, in the same disposition illustrated in FIG. 1 prior to being "exploded". In contrast to the nested relation of FIGS. 3 and 4, it will be seen that in the opposed relationship, there will be fastening at all four corners 28–34 of the flange portion 24. However, in this case, the fastening is accomplished through the tight yet releasable mating engagement between the annular outer boss 44 of fastener 42, with the recess defined by the depending outer boss 54 of the fastener 52.

The opposed fastening relationship depicted in FIG. 5 creates an enclosed chamber 62 which is suitable for storing a packaged article, such as a compact disc 12. In fact, a pair of discs may be accommodated in the chamber 62, one on each tray 10. In addition, in view of the capability for nested engaged trays to define the chamber 60, another feature of the present tray 10 is that multiple trays may be secured to each other in piggyback relationship relative to either or both sides of an opposed pair of trays as shown in FIG. 5. A nested tray assembly 64 made up of two trays 10M and 10T is engageable upon the fastened trays 10U and 10L by virtue of the mating relationship between the recessed center portion 46 of the fastener 42 on the tray 10M and the depending inner boss 58 of the fastener 52 of the tray 10L.

It will be appreciated that, in assembly 64, a fastened relationship will also be created at the diagonally opposite corner. It will also be appreciated that another enclosed chamber 60a will be defined upon the engagement of the tray 10M upon the tray 10L. For this reason, another feature of the present tray is that, if desired, only single trays 10 may be added as additional trays upon the opposed, fastened pair of trays 10U and 10L as shown in FIG. 5. By the same token, the total number of trays which may be piggy backed upon these two trays 10U and 10L is virtually unlimited.

Referring now to FIGS. 6A and 6B, the trays 10 of the present invention are preferably thermoformed from a web of thermoformable plastic material, such as polyethylene or polyvinylchloride. Thus, multiple trays are formed off of a molding tool in sequence. In the event the trays 10 are stacked vertically after formation in nested relationship, the fasteners 42 and 52 (designated A and B respectively in FIGS. 6A and 6B), will be in registry with each other (best seen in FIG. 6A).

In this position, the fasteners 42, 52 will not engage each other at any of the corners 28–34. To achieve a fastened, nested relationship, the upper tray 10U will need to be rotated relative to the lower tray 10L 90° about a common vertical axis to place a fastener 42 above a fastener 52 or vice versa at each corner 28–34 (best seen in FIG. 6B). By the same token, rotation of one tray 10M relative to the other 10L (best seen in FIG. 5) may be required as needed to place the fasteners in proper relationship for fastening engagement in the nested condition when additional trays are added. However, since all corners are engaged in the opposed relationship, no such rotation is required.

Thus, it will be seen that the present tray 10 features the capability of being fastened to a like tray in either opposing or nested relationship. This is due to the advantageous configuration of the fasteners 42, 52 which have a two-sided fastening ability. As a result, trays may be fastened to each other to create stacked containers which are releasable from each other. In addition, the present tray provides a cost-effective and easy to use alternative to conventional compact disc packages.

While a particular embodiment of the package tray having reversible nesting and enclosing fastening feature of the invention has been shown and described, it will be appreciated by those skilled in the art that changes and modifications may be made thereto without departing from the invention in its broader aspects and as set forth in the following claims.

What is claimed is:

1. A package tray configured for use with at least one other such tray in forming reclosable enclosed packages, comprising:

a recess portion having an upper edge;

a flange portion projecting from said upper edge and having upper and lower surfaces;

at least one snap fastener of a first type located on said flange portion;

at least one snap fastener of a second type located on said flange portion in spaced relationship to said at least one fastener of said first type;

at least one of said first and second type fasteners being configured to be fastenable from both said upper and lower surfaces of said flange portion to opposing fasteners of one of said first and second types on a single surface of another such tray; and wherein said at least one fastener of said first type and said at least one fastener of said second type each include an outer fastener and an inner fastener located radially within said outer fastener.

2. The package tray as defined in claim 1 wherein said first and second type fasteners are disposed on said flange portion so that when multiples of said package trays are placed in vertically stacked relationship, at least one opposing pair of said fasteners on adjacent trays engage each other to secure said trays together in one of a nested and an opposing relationship.

3. The package tray as defined in claim 1 wherein there are at least two fasteners of said first type and at least two fasteners of said second type, said fasteners of said first and second types being disposed in alternating relationship on said flange portion.

4. The package as defined in claim 1 wherein said at least one fastener of said first type and said at least one fastener of said second type are constructed and arranged on said flange portion so that when said trays are fastened together in opposed relationship, said outer fastener of said first type matingly engages said outer fastener of said second type.

5. The package as defined in claim 1 wherein said at least one fastener of said first type and said at least one fastener of said second type are constructed and arranged on said flange portion so that when said ways are fastened together in nested relationship, said inner fastener of said first type matingly engages said inner fastener of same second type.

6. The package as defined in claim 1 wherein said at least one fastener of said first type is an annular boss projecting vertically from said upper surface of said flange portion and defining a recessed center portion.

7. The package as defined in claim 1 wherein said at least one fastener of said second type is an annular outer boss depending from said lower surface of said flange portion, said outer boss having a floor and defining an inner boss of smaller diameter depending from said floor.

8. The package as defined in claim 1 wherein said at least one fastener of said first type is an annular boss projecting upwardly from said upper surface of said flange portion and defining a recessed center portion, and said at least one fastener of said second type is an annular outer boss depending from said lower surface of said flange portion, said outer boss having a bottom, an inner annular surface and defining an inner boss of smaller diameter depending from said bottom, wherein said annular boss of said first fastener type is dimensioned to be matingly accommodated by said inner annular surface of said annular outer boss of said second fastener type, and said recessed center portion of said first fastener type is dimensioned to matingly accommodate said inner boss of said second fastener type.

9. The package tray as defined in claim 8, wherein said first and second fastener types are disposed on said flange portion so that, upon placement of a pair of said trays in opposing relationship to each other, a fastener of said first type corresponds with a fastener of the second type so that said annular boss of said first fastener type is releasably engaged in said inner annular surface of said annular boss of said second fastener type.

10. The package tray as defined in claim 9, wherein said first and second fasteners are disposed on said flange so that upon the placement of an additional one of said trays in nesting or piggy back relationship upon one of said opposing trays, upon proper orientation of said additional tray, said recessed center portion of said first fastener type on said additional tray releasably engages said inner boss of said second fastener type on one of said opposing trays.

11. The package tray as defined in claim 8, wherein said first and second fastener types are disposed on said flange portion so that, upon placement of a pair of said trays in vertically nesting relationship, said recessed center portion of said first fastener type on the bottom tray is releasably engageable said inner boss of smaller diameter of said second fastener type on the upper tray.

12. The package tray as defined in claim 1 wherein said flange is provided with at least one finger recess for facilitating removal of packaged articles from said tray.

13. The package tray as defined in claim 1 wherein said recess portion is provided with a central locating boss for securing packaged articles in the recess.

14. A package formed by at least two trays, each said tray comprising:

a recess portion having an upper edge;

a flange portion projecting from said upper edge and having upper and lower surfaces;

at least one snap fastener of a first type located on said flange portion;

at least one snap fastener of a second type located on said flange portion in spaced relationship to said at least one fastener of said first type;

at least one of said first and second type fasteners being configured to be fastenable from both said upper and lower surfaces of said flange portion to opposing fasteners of one of said first and second types on a single surface of another such tray; and said at least one fastener of said first type and said at least one fastener of said second type each include an outer fastener and an inner fastener located radially within said outer fastener;

wherein said first and second type fasteners are disposed on said flange portion so that when multiples of said package trays are placed in vertically stacked relationship, at least one opposing pair of said fasteners on adjacent trays is engageable to secure said trays together in one of a nested and an opposing relationship.

15. The package defined in claim 14 including two of said trays fastened to each other in opposed relationship, and at least one additional tray secured in nested fashion to at least one of the two opposed trays.

16. The package as defined in claim 15 wherein said at least one additional tray engages one of said at least one opposed trays at the lower surface of the flange.

17. The package as defined in claim 14 wherein said first and second fastener types are constructed and arranged on said flange portion so that when said trays are fastened to each other in opposed relationship, opposing fasteners of said first and second types matingly engage each other at said outer fasteners.

18. The package as defined in claim 14, wherein said first and second fastener types are disposed on said flange portion so that, upon placement of a pair of said ways in vertically nesting relationship with at least a top and bottom tray, said inner fastener of said first fastener type on the bottom tray is releasably engageable with said inner fastener type of said second fastener type on the upper tray.

* * * * *

UNITED STATES PATENT AND TRADEMARK OFFICE
CERTIFICATE OF CORRECTION

PATENT NO. : 5,634,559
DATED : June 3, 1997
INVENTOR(S) : Douglas E. Foos et al.

It is certified that error appears in the above-indentified patent and that said Letters Patent is hereby corrected as shown below:

Column 1, line 59, delete "package," and insert --package--.

In the Claims:

Column 6, line 44, delete "ways" and insert --trays--;

Column 6, line 46, delete "same" and insert --said--; and

Column 8, line 35, delete "ways" and insert --trays--.

Signed and Sealed this

Seventh Day of July, 1998

Attest:

*Attesting Officer*

BRUCE LEHMAN

*Commissioner of Patents and Trademarks*